United States Patent
Abe et al.

(10) Patent No.: US 11,689,301 B2
(45) Date of Patent: Jun. 27, 2023

(54) ELECTRIC FIELD MAP GENERATION DEVICE, METHOD, PROGRAM, AND LOCALIZATION DEVICE

(71) Applicant: NIPPON TELEGRAPH AND TELEPHONE CORPORATION, Tokyo (JP)

(72) Inventors: Hirofumi Abe, Tokyo (JP); Keihiro Ochiai, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 200 days.

(21) Appl. No.: 17/054,415

(22) PCT Filed: Apr. 22, 2019

(86) PCT No.: PCT/JP2019/017083
§ 371 (c)(1),
(2) Date: Nov. 10, 2020

(87) PCT Pub. No.: WO2019/220879
PCT Pub. Date: Nov. 21, 2019

(65) Prior Publication Data
US 2021/0242950 A1 Aug. 5, 2021

(30) Foreign Application Priority Data
May 14, 2018 (JP) ................................ 2018-093105

(51) Int. Cl.
*H04B 17/318* (2015.01)
*G01S 5/02* (2010.01)
*H04W 64/00* (2009.01)

(52) U.S. Cl.
CPC ........ *H04B 17/318* (2015.01); *G01S 5/02524* (2020.05); *G01S 5/02525* (2020.05); *H04W 64/00* (2013.01)

(58) Field of Classification Search
CPC ..... H04W 64/00; H04W 64/003; H04W 4/33; H04W 24/06; H04W 16/20
See application file for complete search history.

(56) References Cited

U.S. PATENT DOCUMENTS

2012/0309336 A1 12/2012 Tanaka et al.
2017/0142684 A1* 5/2017 Bhatt .................. H04W 64/006

FOREIGN PATENT DOCUMENTS

FR        3072181 B1 * 11/2019 ........... G01C 21/165
JP    2012251784 A     12/2012
(Continued)

OTHER PUBLICATIONS

Hatena Blog (2016) "an anthropoid ape who wants to be human: I tried three-point positioning ~ TriThingPulse ~," Web Address: http://wannabehuman.hatenablog.com/entry/2016/07/28/001546.
(Continued)

*Primary Examiner* — Kevin Kim

(57) ABSTRACT

Time and effort to generate an electric field map to realize high-accuracy positioning is reduced. In an electric field map generation device (10) that generates an electric field map in which RSSI obtained when radio waves transmitted from a beacon (60) are observed at each of a plurality of points in the same space is associated with each of coordinates at the plurality of points, a radio wave strength acquisition unit (12) acquires RSSI observed at each of at least three observation points different in distance from the beacon (60), a space propagation characteristics estimation unit (14) estimates space propagation characteristics of the radio waves transmitted from the beacon (60) in the same space using the acquired RSSI at the observation points, a
(Continued)

radio wave strength estimation unit (16) estimates RSSI at estimation points on the basis of the estimated space propagation characteristics and distances between the estimation points different from the observation points and the beacon (60), and a generation unit (18) generates the electric field map (26) using the RSSI at the observation points and the estimation points.

17 Claims, 12 Drawing Sheets

(56) References Cited

FOREIGN PATENT DOCUMENTS

| | | | |
|---|---|---|---|
| JP | 2017227531 A | 12/2017 | |
| JP | 201856713 A | 4/2018 | |
| WO | WO-2019110117 A1 * | 6/2019 | ........... G01C 21/206 |
| WO | WO-2021029521 A1 * | 2/2021 | ........... G01S 5/0063 |

OTHER PUBLICATIONS

Longo et al. (2017) "Localization and monitoring system based on BLE fingerprint method," Workshop on Artificial Intelligence with Application in Health, Bari, Italy, Nov. 14, 2017, 8 pages.
Koyanagi et al. (2014) "Study on Efficient Construction of Radio Intensity Map for Location Fingerprinting," Collection of Lectures at the 76th National Congress of the Information Processing Society of Japan, pp. 3-179-180.

\* cited by examiner

Fig. 3

| BEACON ID | OBSERVATION No COORDINATES | 1 | 2 | 3 | 4 | 5 | 6 | 7 | 8 | 9 | 10 |
|---|---|---|---|---|---|---|---|---|---|---|---|
| 61 | (1,1) | −46.9 | −50.5 | −49.8 | −43.5 | −42.9 | −47.8 | −45.2 | −55.8 | −52.2 | −47.0 |
| | (1,3) | 59.6 | 55.1 | 54.9 | 59.0 | 56.2 | 56.8 | 48.1 | 52.5 | 51.9 | 54.2 |
| | (3,1) | −48.5 | −57.1 | −53.3 | −55.7 | −55.8 | −52.0 | −53.3 | −57.5 | −55.1 | −54.7 |
| | (3,3) | −52.7 | 56.6 | −56.4 | −52.5 | −61.6 | 65.0 | −50.3 | −55.5 | −63.5 | −57.5 |
| 62 | ... | | | | | | | | | | |
| 63 | ... | | | | | | | | | | |
| 64 | ... | | | | | | | | | | |

| BEACON ID | OBSERVATION No. COORDINATES | 1 | 2 | 3 | 4 | 5 | 6 | 7 | 8 | 9 | 10 |
|---|---|---|---|---|---|---|---|---|---|---|---|
| 61 | (1,1) | -48.1 | -48.1 | -47.9 | -47.5 | -47.5 | -47.9 | -48.3 | -49.1 | -49.2 | -49.0 |
|  | (1,3) | 55.3 | 55.2 | 55.2 | 55.2 | 54.9 | 54.4 | 53.7 | 53.5 | 53.4 | 53.5 |
|  | (3,1) | -54.1 | -54.4 | -54.4 | -54.5 | -54.6 | -54.5 | -54.6 | -54.9 | -54.9 | -54.8 |
|  | (3,3) | -56.8 | -56.9 | 57.0 | -57.1 | -57.7 | 58.0 | -57.5 | -57.7 | -58.2 | -58.1 |
| 62 | ... |  |  |  |  |  |  |  |  |  |  |
| 63 | ... |  |  |  |  |  |  |  |  |  |  |
| 64 | ... |  |  |  |  |  |  |  |  |  |  |

|  | (1,1) | (1,3) | (3,1) | (3,3) |
|---|---|---|---|---|
| DISTANCE | 1.4 | 3.2 | 3.2 | 4.2 |
| RSSI | -65 | -67 | -67 | -69 |

Fig. 7

| BEACON ID | ESTIMATED RADIO WAVE PROPAGATION FORMULA |
|---|---|
| 61 | $f(d) = -45.2 - 18.8 log_{10}(d)$ |
| 62 | $f(d) = -45.7 - 19.1 log_{10}(d)$ |
| 63 | $f(d) = -46.2 - 18.5 log_{10}(d)$ |
| 64 | $f(d) = -45.6 - 18.3 log_{10}(d)$ |

Fig. 8

| COORDINATES / BEACON ID | (1,1) | (1,2) | (1,3) | (1,4) | (2,1) | (2,2) | (2,3) | (2,4) | (3,1) | (3,2) | (3,3) | (3,4) | (4,1) | (4,2) | (4,3) | (4,4) |
|---|---|---|---|---|---|---|---|---|---|---|---|---|---|---|---|---|
| 61 | -48.0 | -51.7 | -54.5 | -56.7 | -51.7 | -53.6 | -55.6 | -57.4 | -54.5 | -55.6 | -56.9 | -58.3 | -56.7 | -57.4 | -58.3 | -59.3 |
| 62 | -50.6 | -46.7 | -46.7 | -50.6 | -53.3 | -51.7 | -51.7 | -53.3 | -55.8 | -55.0 | -55.0 | -55.8 | -57.8 | -57.3 | -57.3 | -57.8 |
| 63 | -50.9 | -53.5 | -55.9 | -57.8 | -47.1 | -52.0 | -55.1 | -57.4 | -47.1 | -52.0 | -55.1 | -57.4 | -50.9 | -53.5 | -55.9 | -57.8 |
| 64 | -51.6 | -49.3 | -49.3 | -51.6 | -49.3 | -42.9 | -42.9 | -49.3 | -49.3 | -42.9 | -42.9 | -49.3 | -51.6 | -49.3 | -49.3 | -51.6 |

| TIME SLOT<br>BEACON ID | 1 | 2 | 3 | ... |
|---|---|---|---|---|
| 61 | −54 | −56 | −57 | |
| 62 | −52 | −53 | −55 | |
| 63 | −52 | −55 | −55 | |
| 64 | −43 | −42 | −43 | |

Fig. 10

| TIME SLOT | 1 | 2 | 3 | ... |
|---|---|---|---|---|
| POSITION | (2,2) | (2,3) | (3,3) | |

ELECTRIC FIELD MAP GENERATION DEVICE, METHOD, PROGRAM, AND LOCALIZATION DEVICE

CROSS-REFERENCE TO RELATED APPLICATIONS

This application is a U.S. 371 Application of International Patent Application No. PCT/JP2019/017083, filed on 22 Apr. 2019, which application claims priority to and the benefit of JP Application No. 2018-093105, filed on 14 May 2018, the disclosures of which are hereby incorporated herein by reference in their entireties.

TECHNICAL FIELD

The present invention relates to an electric field map generation device, a method, a program, and a positioning device.

BACKGROUND ART

Through the use of users' position information obtained by the acquisition of the values of the radio wave strength of beacons or WiFi™, various services have been provided. For example, services using position information such as customer guidance based on geofencing at outdoor places and geofencing at indoor places such as station yards and commercial establishments have been provided.

Meanwhile, expectations for high-accuracy positioning at indoor places have been raised with the appearance of BLE (Bluetooth™ Low Energy) beacons. As methods for realizing indoor high-accuracy positioning using BLE beacons, there are roughly two methods of three-point positioning (for example, NPL 1) and a fingerprint method (for example, NPL 2). The three-point positioning is a method in which the distance between an observer and a beacon is calculated from radio wave strength to specify one point on a plane. The three-point positioning is greatly influenced by the noise of radio wave strength and therefore has a difficulty in increasing accuracy.

On the other hand, the fingerprint method is a method in which radio wave strength at respective points on a field is observed and collected in advance to generate an electric field map expressing the radio wave strength at the respective points and the positions of unknown points are specified by matching the electric field map to electric field strength that has been observed at the unknown points, and has the advantage that accuracy is easily increased.

CITATION LIST

Non Patent Literature

[NPL 1] "3-*Ten Sokui wo Yatte-mica*" (I Tried Three-Point Positioning) ~TriThingPulse~", [online], Jul. 28, 2016, Patent Institute, [searched on Apr. 25, 2018], on the Internet <URL: http://http://wannabehuman.hatenablog.com/entry/2016/07/28/001546>
[NPL 2] "Localization and monitoring system based on BLE fingerprint method", Annalisa Longo, Maria Rizzi, Davide Amendolare, Sante Stanisci, Ruggero Russo, Gianpaolo Cice and Matteo D'Aloia, D. Impedovo and G. Pirlo (Eds.), Workshop on Artificial Intelligence with Application in Health, Bari, Italy, Nov. 14, 2017.

SUMMARY OF THE INVENTION

Technical Problem

As described above, radio wave strength at observation points is observed in advance to generate an electric field map in the fingerprint method. However, the number of observation points contributes to positioning accuracy using the generated electric field map. Therefore, it is desirable to observe radio wave strength in advance at many observation points and generate an electric field map in order to realize high-accuracy positioning. However, there is a problem that the observation of radio wave strength requires time and effort.

The present invention has been made in consideration of the above problem and has an object of providing an electric field map generation device, a method, and a program capable of reducing time and effort to generate an electric field map to realize high-accuracy positioning, and a positioning device that performs positioning using a generated electric field map.

Means for Solving the Problem

In order to achieve the above object, an electric field map generation device according to the present invention is an electric field map generation device that generates an electric field map in which radio wave strength obtained when radio waves transmitted from a radio wave transmission device are observed at each of a plurality of points in the same space is associated with each of coordinates at the plurality of points, the electric field map generation device including: a radio wave strength acquisition unit that acquires radio wave strength observed at each of at least three first points different in distance from the radio wave transmission device; a space propagation characteristics estimation unit that estimates space propagation characteristics of the radio waves transmitted from the radio wave transmission device in the same space using the acquired radio wave strength; a radio wave strength estimation unit that estimates radio wave strength, which is obtained when the radio waves transmitted from the radio wave transmission device are observed at second points, on the basis of the space propagation characteristics estimated by the space propagation characteristics estimation unit and distances between the second points different from the first points and the radio wave transmission device; and a generation unit that generates the electric field map using at least the radio wave strength at the second points among the radio wave strength at the first points that is acquired by the radio wave strength acquisition unit and the radio wave strength at the second points that is estimated by the radio wave strength estimation unit.

In an electric field map generation device according to the present invention, a radio wave strength acquisition unit acquires radio wave strength observed at each of at least three first points different in distance from the radio wave transmission device, a space propagation characteristics estimation unit estimates space propagation characteristics of the radio waves transmitted from the radio wave transmission device in the same space using the acquired radio wave strength, a radio wave strength estimation unit estimates radio wave strength, which is obtained when the radio waves transmitted from the radio wave transmission device are observed at second points, on the basis of the space propagation characteristics estimated by the space propagation characteristics estimation unit and distances between the second points different from the first points and the radio wave transmission device, and a generation unit generates the electric field map using at least the radio wave strength at the second points among the radio wave strength at the first points that is acquired by the radio wave strength acquisition unit and the radio wave strength at the second points that is estimated by the radio wave strength estimation unit.

Thus, time and effort to generate an electric field map to realize high-accuracy positioning can be reduced.

Further, the space propagation characteristics estimation unit can estimate a radio wave propagation formula, which expresses radio wave strength according to a distance from the radio wave transmission device, using at least the space propagation characteristics, and the radio wave strength estimation unit can estimate the radio wave strength, which is obtained when the radio waves transmitted from the radio wave transmission device are observed at the second points, using the radio wave propagation formula estimated by the space propagation characteristics estimation unit.

Further, the radio wave strength acquisition unit can smoothen a plurality of radio wave strength obtained when the radio waves transmitted from the radio wave transmission device are observed a plurality of times at the first points, and acquire radio wave strength having the greatest value among the plurality of smoothened radio wave strength as the radio wave strength observed at each of the first points. Thus, the fluctuation of the value of observed radio wave strength can be reduced, and high-accuracy radio wave strength can be acquired.

Further, the radio wave strength acquisition unit can acquire the radio wave strength observed at at least each of the three first points for each of a plurality of the radio wave transmission devices, the space propagation characteristics estimation unit can estimate each of the space propagation characteristics for radio waves transmitted from each of the plurality of the radio wave transmission devices, the radio wave strength estimation unit can estimate each of radio wave strength obtained when the radio waves transmitted from each of the plurality of the radio wave transmission devices are observed at the second points, and the generation unit can generate the electric field map by associating each of the first points and the second points, the plurality of the radio wave transmission devices, and the acquired or estimated radio wave strength with each other.

A positioning device according to the present invention can include: an unknown point radio wave strength acquisition unit that acquires radio wave strength obtained when the radio waves transmitted from each of the plurality of the radio wave transmission devices are observed at unknown points; and a position estimation unit that estimates coordinates of the unknown points on the basis of the radio wave strength corresponding to each of the plurality of the radio wave transmission devices that is acquired by the unknown point radio wave strength acquisition unit and the electric field map generated by the electric field map generation device according to claim 5. Thus, high-accuracy positioning can be realized.

Further, an electric field map generation method according to the present invention is an electric field map generation method for generating an electric field map in which radio wave strength obtained when radio waves transmitted from a radio wave transmission device are observed at each of a plurality of points in the same space is associated with each of coordinates at the plurality of points, the electric field map generation method including: acquiring radio wave strength observed at each of at least three first points different in distance from the radio wave transmission device by a radio wave strength acquisition unit; estimating space propagation characteristics of the radio waves transmitted from the radio wave transmission device in the same space using the acquired radio wave strength by a space propagation characteristics estimation unit; estimating radio wave strength, which is obtained when the radio waves transmitted from the radio wave transmission device are observed at second points, on the basis of the space propagation characteristics estimated by the space propagation characteristics estimation unit and distances between the second points different from the first points and the radio wave transmission device by a radio wave strength estimation unit; and generating the electric field map using at least the radio wave strength at the second points among the radio wave strength at the first points that is acquired by the radio wave strength acquisition unit and the radio wave strength at the second points that is estimated by the radio wave strength estimation unit by a generation unit.

Further, a program according to the present invention is a program for causing a computer to function as each of the units constituting the electric field map generation device described above or the positioning device described above.

Effects of the Invention

According to the electric field map generation device, the method, and the program of the present invention, the space propagation characteristics of radio waves transmitted from a radio wave transmission device are estimated on the basis of radio wave strength observed at at least three first points different in distance from the radio wave transmission device, radio wave strength at second points different from the first points is estimated using the space propagation characteristics, and an electric field map is generated using the observed radio wave strength and the estimated radio wave strength. As a result, the effect that time and effort to generate an electric field map to realize high-accuracy positioning can be reduced is obtained. Further, according to the positioning device of the present invention, positioning is performed using an electric field map generated by the electric field map generation device according to the present invention. As a result, the effect that high-accuracy positioning can be realized is obtained.

BRIEF DESCRIPTION OF DRAWINGS

FIG. 3 is a diagram showing an example of an acquired radio wave strength DB.

FIG. 4 is a diagram showing an example of a smoothened radio wave strength DB.

FIG. 5 is a diagram showing an example of combinations of the distances between a beacon and observation points and RSSI at the observation points.

FIG. 7 is a diagram showing an example of a radio wave propagation formula estimated for each beacon ID.

FIG. 8 is a diagram showing an example of an electric field map.

FIG. 9 is a diagram showing an example of the representative values of RSSI in respective time slots, the representative values being specified for each beacon ID.

FIG. 10 is a diagram showing an example of coordinates specified using the electric field map.

DESCRIPTION OF EMBODIMENTS

Hereinafter, an embodiment of the present invention will be described in detail with reference to the drawings.

Figure 1:
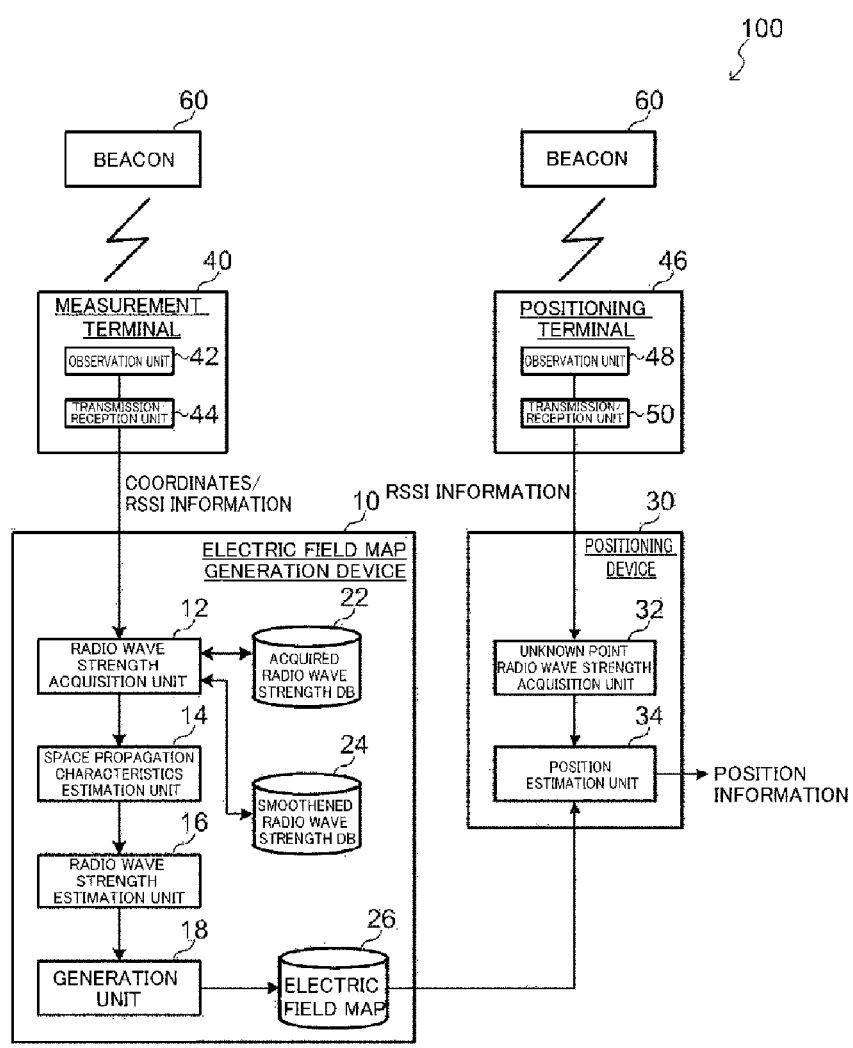
FIG. 1 is a block diagram showing the schematic configuration of an electric field map generation/positioning system according to the present embodiment.

As shown in FIG. 1, an electric field map generation/positioning system 100 according to the present embodiment includes an electric field map generation device 10, a positioning device 30, a measurement terminal 40, a positioning terminal 46, and a plurality of beacons 60.

The beacons 60 transmit, for example, a beacon signal based on BLE (Bluetooth™ Low Energy) at a prescribed time interval. The beacon signal transmitted from the beacons 60 contains a beacon ID (Identification) that is identification information on an own device. Note that each of the beacons 60 is an example of the radio wave transmission device of the present invention. However, the radio wave transmission device is not limited to a beacon and may include any device that transmits other signals such as an access point that transmits a WiFi™ signal.

The measurement terminal 40 is a terminal used to observe radio wave strength at previously-specified observation points to generate an electric field map. The measurement terminal 40 is realized by an information processing device such as a smartphone and a tablet terminal. As shown in FIG. 1, the measurement terminal 40 functionally includes an observation unit 42 and a transmission/reception unit 44.

The observation unit 42 receives beacon signals transmitted from the beacons 60 and observes radio wave strength (RSSI: Received Signal Strength Indicator) at the reception. Further, the observation unit 42 acquires the coordinates of observation points. For example, as an operator holding the measurement terminal 40 stands at a previously-specified observation point and inputs the coordinates of the position, the observation unit 42 can acquire the input coordinates. Further, by a method such as three-point positioning using beacon signals transmitted from the plurality of beacons 60, the observation unit 42 may measure the position of the measurement terminal 40 and acquire the coordinates of an observation point. The observation unit 42 transfers beacon IDs contained in beacon signals, observed RSSI, and acquired coordinates to the transmission/reception unit 44.

The transmission/reception unit 44 exchanges information with the electric field map generation device 10. Specifically, the transmission/reception unit 44 transmits beacon IDs, RSSI, and coordinates that have been transferred from the observation unit 42 to the electric field map generation device 10 as coordinates/RSSI information.

The positioning terminal 46 is a terminal of which the position is to be measured using an electric field map and realized by an information processing device such as a smartphone and a tablet terminal. As shown in FIG. 1, the positioning terminal 46 functionally includes an observation unit 48 and a transmission/reception unit 50.

Like the observation unit 42 of the measurement terminal 40, the observation unit 48 observes the RSSI of beacon signals transmitted from the beacons 60. The observation unit 48 transfers beacon IDs contained in beacon signals and observed RSSI to the transmission/reception unit 50.

The transmission/reception unit 50 exchanges information with the positioning device 30. Specifically, the transmission/reception unit 50 transmits beacon IDs and RSSI that have been transferred from the observation unit 48 to the positioning device 30 as RSSI information.

The electric field map generation device 10 can be constituted by a computer including a CPU, a RAM, and a ROM storing a program or various data for performing an electric field map generation processing routine that will be described later.

Figure 2:
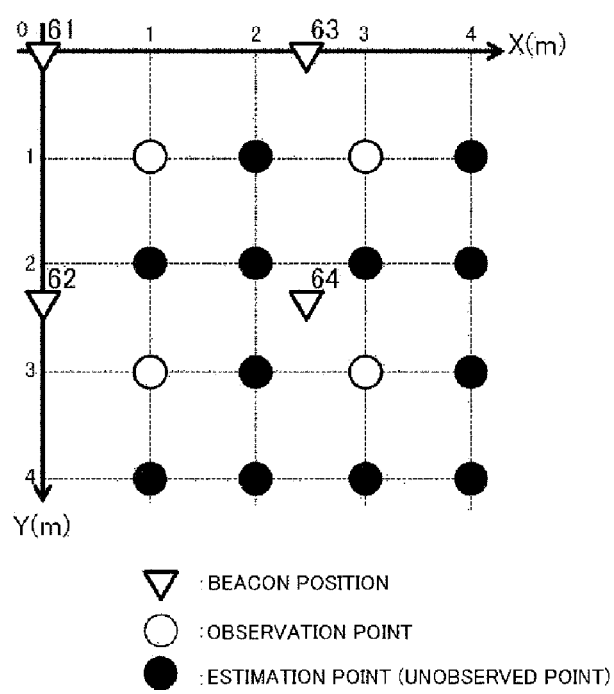
FIG. 2 is a diagram for describing observation points and estimation points.

Here, the outline of the generation of an electric field map by the electric field map generation device 10 in the present embodiment will be described. As shown in FIG. 2, a case in which coordinates are set every 1 m on an XY plane associated with a prescribed field will be described as an example.

In generating an electric field map in which RSSI at points expressed by totally 16 coordinates of the coordinates (1, 1), (1, 2), . . . , (4, 3), (4, 4) contained in the same space is mapped, it is essentially required to observe the RSSI at the 16 points. Note that the same space is a space in which characteristics that are the same or may be regarded as being the same are applicable as the space propagation characteristics of radio waves transmitted from the beacons 60.

On the other hand, the electric field map generation device 10 according to the present embodiment reduces in advance the number of observation points at which radio wave strength is to be observed in order to generate an electric field map, and estimates RSSI at estimation points (unobserved points) on the basis of RSSI observed at a small number of observation points to generate the electric field map. In the example of FIG. 2, observation points are expressed as white circles, and estimation points are expressed as black circles. Further, in FIG. 2, inverted triangle marks express the installed positions of the beacons 60, and numbers written along with the inverted triangle marks express the beacon IDs of the respective beacons 60. In the example of FIG. 2, RSSI is observed at four points of the coordinates (1, 1), (1, 3), (3, 1), and (3, 3) and is not observed at the other points (estimation points).

Note that the example of FIG. 2 shows a case in which observation points and estimation points are regularly set on squares for the purpose of simplifying a description. However, observation points are only required to be set at at least three arbitrary points different in distance from the beacons 60. The reason why observation points are set at at least three points different in distance from the beacons 60 will be described later. Further, the estimation points may be set on a straight line passing through any two of observation points, or may be set at points other than a straight line. That is, estimation points can be set at arbitrary positions without being limited to positions capable of being complemented from the positions of observation points.

Note that each of observation points is an example of a first point of the present invention, and each of estimation points is an example of a second point of the present invention.

As shown in FIG. 1, the electric field map generation device 10 functionally includes a radio wave strength acquisition unit 12, a space propagation characteristics estimation unit 14, a radio wave strength estimation unit 16, and a generation unit 18. Further, the electric field map generation device 10 stores an acquired radio wave strength database (DB) 22, a smoothened radio wave strength DB 24, and an electric field map 26 in its prescribed storage region.

The radio wave strength acquisition unit 12 acquires coordinates/RSSI information that has been observed by the measurement terminal 40 at each of at least three observation points different in distance from the beacons 60 and has been transmitted by the measurement terminal 40, and stores RSSI contained in the acquired coordinates/RSSI information in the acquired radio wave strength DB 22.

FIG. 3 shows an example of the acquired radio wave strength DB 22. In the example of FIG. 3, an RSSI value is stored for each beacon ID and for each coordinates of an observation point in the acquired radio wave strength DB 22. Further, an "observation No." is a number showing the order of RSSI observation performed a plurality of times at the same observation points.

Specifically, the radio wave strength acquisition unit 12 prepares in advance the acquired radio wave strength DB 22 in which the coordinates of specified observation points are set. Then, every acquisition of coordinates/RSSI information, the radio wave strength acquisition unit 12 stores an RSSI value contained in the coordinates/RSSI information in a section corresponding to a beacon ID and coordinates contained in the coordinates/RSSI information in the acquired radio wave strength DB 22.

Further, after completing the acquisition of coordinates/RSSI information for a prescribed number of times, the radio wave strength acquisition unit 12 smoothens RSSI that has been stored in the acquired radio wave strength DB 22 for each beacon ID and for each coordinates of an observation point and stores the smoothened RSSI as the smoothened radio wave strength DB 24. For smoothening, a known smoothening filter is applicable. FIG. 4 shows an example of the smoothened radio wave strength DB 24 in which the acquired radio wave strength DB 22 shown in FIG. 3 is smoothened.

By referring to the smoothened radio wave strength DB 24, the radio wave strength acquisition unit 12 specifies, for each beacon ID and for each coordinates of an observation point, RSSI having the greatest value among smoothened RSSI as the representative value of the RSSI about the beacon ID and the coordinates of the observation point. Note that the reason why the RSSI having the greatest value among the smoothened RSSI is used as the representative value of the RSSI is that an increase in accuracy with the use of the RSSI having the greatest value was confirmed as a result of an experiment. However, RSSI other than the RSSI having the greatest value among the smoothened RSSI may be specified as the representative value of the RSSI. In the smoothened radio wave strength DB 24 shown in FIG. 4, RSSI in sections indicated by thick lines is the representative value of specified RSSI.

As described above, representative values are specified after the smoothening of acquired RSSI, whereby it is possible to reduce the fluctuation of a value caused in RSSI that is observed raw data and use a value from which noise has been removed in subsequent processing.

The radio wave strength acquisition unit 12 transfers beacon IDs, the coordinates of observation points, and the representative values of specified RSSI to the space propagation characteristics estimation unit 14 and the generation unit 18 in association with each other.

Using RSSI that has been transferred from the radio wave strength acquisition unit 12, the space propagation characteristics estimation unit 14 estimates the space propagation characteristics of radio waves transmitted from the beacons 60 in the same space.

Generally, the RSSI of beacon signals observed at points distant from the beacons 60 is expressed by the radio wave propagation formula represented as the following formula (1).

$$RSSI = K - (n \times \log_{10} d - C) \tag{1}$$

Note that d in formula (1) is a distance (d>0) from the installed positions of the beacons 60 to observation positions. K is the maximum radio wave output of the beacons 60. C is a constant term expressing transmitted radio wave strength and is radio wave strength at a point distant from the beacons 60 by a prescribed distance (for example, 1 m). Further, n is a space propagation constant. K is a known value in formula (1), and K=0 dB is established in the present embodiment. n and C are model coefficients that vary with environment.

Figure 6:
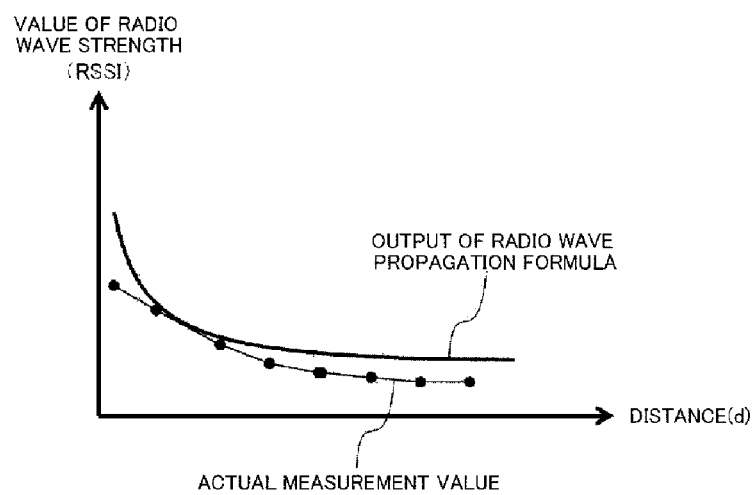
FIG. 6 is a diagram for describing a radio wave propagation formula.

The space propagation characteristics estimation unit 14 derives a combination (n, C) of optimum model coefficients for each beacon ID. Specifically, as shown in FIG. 5, the space propagation characteristics estimation unit 14 specifies, for each beacon ID, a combination of the distance between each of the beacons 60 and an observation point and an actual measurement value of RSSI at the observation point. The example of FIG. 5 is an example about the beacon 60 of which the beacon ID is 61. On the basis of combinations of specified distances and actual measurement values, the space propagation characteristics estimation unit 14 plots the actual measurement values corresponding to the distances as shown in FIG. 6. Then, the space propagation characteristics estimation unit 14 derives an optimum combination (n, C) by estimating the radio wave propagation formula of the formula (1) that is, for example, a curved line approximating a radio wave propagation curved line obtained by connecting the plotted actual measurement values to each other according to a least squares method or the like. Note that a method for deriving an optimum combination (n, C) is not limited to the least squares method but various optimization methods are applicable.

FIG. 7 shows an example of a radio wave propagation formula estimated for each beacon ID. The space propagation characteristics estimation unit 14 transfers a radio wave propagation formula estimated for each beacon ID to the radio wave strength estimation unit 16.

Here, the reason why observation points are set at at least three points different in distance from the beacons 60 will be described. The radio wave propagation formula represented as the following formula (1) can be simply expressed as y=d $\log_{10}(x)+C$. Here, when $u=\log_{10}(x)$ is assumed, y=d $\log_{10}(x)+C$ can be expressed as v=du+C. Since the formula is a linear function having d and C as constants, the constants d and C are uniquely fixed if only two groups of (v, u) are provided. Accordingly, in order to estimate a radio wave propagation formula that is a curved line approximating a radio wave propagation curved line obtained by connecting measurement values to each other, groups of (v, u), that is, three or more groups of (x, y) are required. For this reason, three or more observation points are required.

Further, the reason why the distances between each of three or more observation points and the beacons 60 are required to be different from each other is that, if all the three or more observation points are arranged on a concentric circle at an equal distance from the beacons 60, a radio wave propagation formula that is a curved line approximating a radio wave propagation curved line obtained by connecting plotted measurement values to each other cannot be correctly estimated.

In addition, although places at which observation points are set are not required conditions, it is desirable that the observation points not be set near a wall since an error is likely to be caused under influence due to the reflection of radio waves. Further, since an error is also caused by influence due to the absorption, diffraction, or the like of radio waves, it is desirable that no obstacles exist between the beacons 60 and observation points.

On the basis of space propagation characteristics that have been estimated by the space propagation characteristics estimation unit 14 and the distances between estimation points and the beacons 60, the radio wave strength estimation unit 16 estimates RSSI with the assumption that beacon signals transmitted from the beacons 60 have been observed at the estimation points.

Specifically, the radio wave strength estimation unit 16 estimates RSSI at estimation points by calculating the distances d between the coordinate positions of points set at the estimation points and the installed positions of the beacons 60 and substituting the calculated distances d into the space propagation characteristics of radio waves that have been transmitted from the beacons 60, that is, radio wave propagation formulas corresponding to the beacon IDs of the beacons 60 that have been transferred from the space propagation characteristics estimation unit 14.

The radio wave strength estimation unit 16 estimates RSSI for each beacon ID and for each coordinates of an estimation point and transfers the beacon IDs, the coordinates of the estimation points, and the estimated RSSI to the generation unit 18 in association with each other.

The generation unit 18 generates the electric field map 26 using RSSI at observation points that have been acquired by the radio wave strength acquisition unit 12 and RSSI at estimation points that have been estimated by the radio wave strength estimation unit 16. Specifically, the generation unit 18 prepares in advance the electric field map 26 expressed by the matrix of the coordinates of specified observation points and estimation points and the beacon IDs of the respective beacons 60. Then, the generation unit 18 stores the RSSI, which has been transferred from the radio wave strength acquisition unit 12 and has been associated with beacon IDs and the coordinates of the observation points, in the corresponding sections of the electric field map 26. Similarly, the generation unit 18 stores the RSSI, which has been transferred from the radio wave strength estimation unit 16 and has been associated with the beacon IDs and the coordinates of the estimation points, in the corresponding sections of the electric field map 26. FIG. 8 shows an example of the electric field map 26.

The positioning device 30 can be constituted by a computer including a CPU, a RAM, and a ROM storing a program or various data for performing a positioning processing routine that will be described later.

As shown in FIG. 1, the positioning device 30 functionally includes an unknown point radio wave strength acquisition unit 32 and a position estimation unit 34.

The unknown point radio wave strength acquisition unit 32 acquires RSSI information that has been observed by the positioning terminal 46 at unknown coordinate points and has been transmitted by the positioning terminal 46. The unknown point radio wave strength acquisition unit 32 acquires RSSI information a plurality of times for each prescribed time slot (for example, one second). On the basis of RSSI information for a plurality of times acquired for each time slot, the unknown point radio wave strength acquisition unit 32 specifies the representative value of RSSI in the time slot for each beacon ID. As a method for specifying the representative value of RSSI, the unknown point radio wave strength acquisition unit 32 is only required to smoothen RSSI for a plurality of times and specify RSSI having the greatest value among the smoothened RSSI like the radio wave strength acquisition unit 12 of the electric field map generation device 10.

FIG. 9 shows an example of the representative values of RSSI in respective time slots, the representative values being specified for each beacon ID. In the example of FIG. 9, numbers 1, 2, 3, and the like are given as the identification information of the respective time slots.

The unknown point radio wave strength acquisition unit 32 transfers the representative values of specified RSSI to the position estimation unit 34 in association with the numbers of time slots and beacon IDs.

On the basis of the representative values of RSSI that have been transferred from the unknown point radio wave strength acquisition unit 32, the position estimation unit 34 generates a combination of the values of RSSI corresponding to respective beacon IDs for each time slot. In the example of FIG. 9, a combination of (−54, −52, −52, −43) is generated for the first time slot.

The position estimation unit 34 specifies coordinates at which a combination of RSSI for each beacon ID about respective coordinates shows values closest to a generated combination of the values of the RSSI in the electric field map 26. For the specification of a combination of the closest values, a least squares method or the like can be, for example, used. More specifically, when a combination of RSSI at unknown points is (a, b, c, d) and a combination of RSSI in the electric field map 26 is (A, B, C, D), the position estimation unit 34 specifies coordinates corresponding to (A, B, C, D) where f(a, b, c, d) shown in the following formula (2) becomes minimum.

$$f(a,b,c,d)=(a-A)^2+(b-B)^2+(c-C)^2+(d-D)^2 \quad (2)$$

Figure 10:
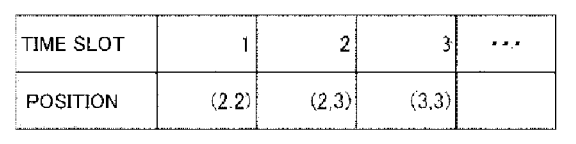

FIG. 10 shows an example of coordinates that have been specified using the electric field map 26 shown in FIG. 8 with respect to the RSSI at the unknown points shown in FIG. 9.

The position estimation unit 34 outputs specified coordinates as position information that has been estimated about unknown points. The output position information may be transmitted to and displayed on the positioning terminal 46, or may be used in a service related to position information via an application that operates on the positioning terminal 46. Further, the position information may be output to other devices.

Next, the operation of the electric field map generation/positioning system 100 according to the present embodiment will be described.

In a state in which a beacon 60 is transmitting a beacon signal containing the beacon ID of its own device at a prescribed time interval, the measurement terminal 40 starts receiving the beacon signal that has been transmitted from the beacon 60. An operator holding the measurement terminal 40 stands at a previously-specified observation point, and the measurement terminal 40 receives the beacon signal for a prescribed number of times within a prescribed time slot at the place. Every reception of the beacon signal, the measurement terminal 40 transmits coordinates/RSSI information containing the beacon ID contained in the received beacon signal, coordinates showing position information on its own terminal, and an RSSI value obtained by observing the beacon signal to the electric field map generation device 10. Meanwhile, the electric field map generation device 10 performs electric field map generation processing shown in FIG. 11 to generate the electric field map 26.

Then, in a state in which the electric field map 26 has been stored in a prescribed storage region and the beacon 60 is transmitting the beacon signal containing the beacon ID of its own device at a prescribed time interval, the positioning terminal 46 starts receiving the beacon signal that has been transmitted from the beacon 60. The positioning terminal 46 receives the beacon signal for a prescribed number of times within a prescribed time slot and transmits RSSI information containing the beacon ID and an RSSI value obtained by observing the beacon signal to the positioning device 30 for a prescribed number of times within a prescribed time slot. Meanwhile, the positioning device 30 performs positioning processing shown in FIG. 12 to estimate position information on the positioning terminal 46. Each of the electric field map generation processing and the positioning processing will be described in detail.

Figure 11:
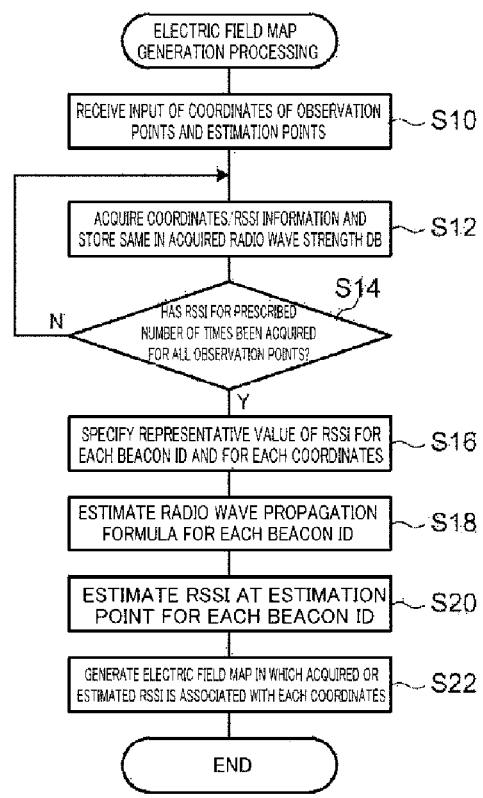
FIG. 11 is a flowchart showing an example of an electric field map generation processing routine in the present embodiment.

First, the electric field map generation processing shown in FIG. 11 will be described.

In step S10, the radio wave strength acquisition unit 12 receives the input of the coordinates of observation points and estimation points. Then, the radio wave strength acquisition unit 12 prepares the acquired radio wave strength DB 22 in which the coordinates of the received observation points are set.

Next, in step S12, the radio wave strength acquisition unit 12 acquires coordinates/RSSI information that has been transmitted from the measurement terminal 40. Then, the radio wave strength acquisition unit 12 stores RSSI values contained in the acquired coordinates/RSSI information in sections corresponding to beacon IDs and coordinates contained in the acquired coordinates/RSSI information in the acquired radio wave strength DB 22.

Next, in step S14, the radio wave strength acquisition unit 12 determines whether RSSI for a prescribed number of times has been acquired for all the set observation points. When the RSSI for the prescribed number of times has been acquired, the processing proceeds to step S16. Otherwise, the processing returns to step S12.

In step S16, the radio wave strength acquisition unit 12 smoothens the RSSI that has been stored in the acquired radio wave strength DB 22 for each beacon ID and for each coordinates of an observation point and stores the smoothened RSSI as the smoothened radio wave strength DB 24. Then, the radio wave strength acquisition unit 12 specifies, for each beacon ID and for each coordinates of an observation point, RSSI having the greatest value among the smoothened RSSI as the representative value of the RSSI about the beacon ID and the coordinates of the observation point from the smoothened radio wave strength DB 24. The radio wave strength acquisition unit 12 transfers the beacon IDs, the coordinates of the observation points, and the representative values of the specified RSSI to the space propagation characteristics estimation unit 14 and the generation unit 18 in association with each other.

Next, in step S18, the space propagation characteristics estimation unit 14 estimates, for each beacon ID, the above radio wave propagation formula represented as the following formula (1) as the space propagation characteristics of radio waves transmitted from the beacon 60 in the same space using the RSSI that has been transferred from the radio wave strength acquisition unit 12. The space propagation characteristics estimation unit 14 transfers the estimated radio wave propagation formula for each beacon ID to the radio wave strength estimation unit 16.

Next, in step S20, the radio wave strength estimation unit 16 estimates RSSI at the estimation points by calculating distances d between the coordinate positions of points set as the estimation points and the installed positions of the beacons 60 and substituting the calculated distances d into the space propagation characteristics of radio waves that have been transmitted from the beacons 60, that is, radio wave propagation formulas corresponding to the beacon IDs of the beacons 60, received from the space propagation characteristics estimation unit 14. The radio wave strength estimation unit 16 estimates RSSI for each beacon ID and for each coordinates of an estimation point and transfers the beacon IDs, the coordinates of the estimation points, and the estimated RSSI to the generation unit 18 in association with each other.

Next, in step S22, the generation unit 18 prepares the electric field map 26 expressed by the matrix of the coordinates of the observation points and the estimation points that have been received in step S10 described above and the beacon IDs of the respective beacons 60. Then, the generation unit 18 stores the RSSI that have been transferred from the radio wave strength acquisition unit 12 in step S12 described above and have been associated with the beacon IDs and the coordinates of the observation points in the corresponding sections of the electric field map 26. Similarly, the generation unit 18 stores the RSSI that have been transferred from the radio wave strength estimation unit 16 in step S20 described above and have been associated with the beacon IDs and the coordinates of the estimation points in the corresponding sections of the electric field map 26. Thus, the electric field map 26 is generated, and the electric field map generation processing ends.

Figure 12:
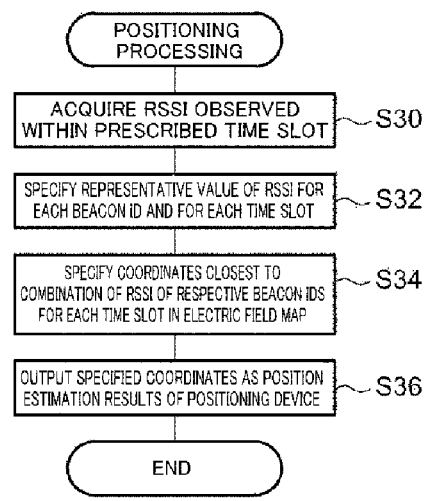
FIG. 12 is a flowchart showing an example of a positioning processing routine in the present embodiment.

Next, the positioning processing shown in FIG. 12 will be described.

In step S30, the unknown point radio wave strength acquisition unit 32 acquires RSSI information, which has been observed by the positioning terminal 46 at unknown coordinates points and has been transmitted by the positioning terminal 46, a plurality of times for each prescribed time slot.

Next, in step S32, the unknown point radio wave strength acquisition unit 32 smoothens RSSI for the plurality of times for each beacon ID on the basis of the RSSI information for the plurality of times that has been acquired for each time slot and specifies RSSI having the greatest value among the smoothened RSSI as the representative value of the RSSI in the time slot. The unknown point radio wave strength acquisition unit 32 transfers the representative values of the specified RSSI to the position estimation unit 34 in association with the number of the time slots and the beacon IDs.

Next, in step S34, the position estimation unit 34 generates a combination of the values of the RSSI corresponding to the respective beacon IDs for each time slot on the basis of the representative values of the RSSI that have been transferred from the unknown point radio wave strength acquisition unit 32. Then, the position estimation unit 34 specifies coordinates at which a combination of the RSSI for each beacon ID about respective coordinates shows values closest to the generated combination of the values of the RSSI in the electric field map 26.

Next, in step S36, the position estimation unit 34 outputs the specified coordinates as position information that has been estimated about unknown points, and then the positioning processing ends.

As described above, an electric field map generation device according to the present embodiment estimates radio wave propagation formulas showing the space propagation characteristics of radio waves transmitted from respective beacons on the basis of RSSI that has been observed at at least three observation points different in distance from the beacons and estimates RSSI at estimation points different from the observation points using the radio wave propagation formulas. Then, the electric field map generation device generates an electric field map using the RSSI at the observation points and the RSSI at the estimation points. Therefore, all the RSSI corresponding to respective coordinates included in an electric field map are not required to be observed, and the number of the coordinates, that is, the RSSI included in the electric field map can be increased. Accordingly, time and effort to generate an electric field map to realize high-accuracy positioning can be reduced.

Further, the electric field map generation device estimates radio wave propagation formulae and estimates RSSI at estimation points. Therefore, positions capable of being complemented from the positions of observation points are not required to be set as estimation points. That is, the estimation points can be set at other arbitrary positions not based on the positional relationships between observation points.

Further, the electric field map generation device smoothens RSSI that has been acquired a plurality of times and specifies representative values as the RSSI of observation points. Thus, the fluctuation of observed RSSI can be reduced, and high-accuracy values can be used as measurement values.

Further, a positioning device according to the present embodiment can realize high-accuracy positioning by performing positioning using the electric field map generated by the electric field map generation device of the present embodiment.

Note that the present embodiment is an example and it goes without saying that a specific configuration is not limited to the present embodiment but includes design or the like within the range of the spirit of the present invention and is modifiable according to circumstances.

The above embodiment describes an example of a case in which four observation points are provided. However, three points or five or more points may be provided as observation points.

Further, the above embodiment describes an example of a case in which the respective function units of the electric field map generation device 10 and the positioning device 30 are realized by performing a program, but the realization of the respective function units of the electric field map generation device 10 and the positioning device 30 is not limited to this. The respective function units of the electric field map generation device 10 and the positioning device 30 may be realized by hardware such as a FPGA (Field-Programmable Gate Array), or may be realized by a combination of hardware and software.

Further, the embodiment in which a program is installed in advance is described in the present specification. However, it is also possible to provide the program in a state of being stored in a computer-readable recording medium or provide the program via a network.

REFERENCE SIGNS LIST

10 Electric field map generation device
12 Radio wave strength acquisition unit
14 Space propagation characteristics estimation unit
16 Radio wave strength estimation unit
18 Generation unit
22 Acquired radio wave strength DB
24 Smoothened radio wave strength DB
26 Electric field map
30 Positioning device
32 Unknown point radio wave strength acquisition unit
34 Position estimation unit
40 Measurement terminal
42 Observation unit
44 Transmission/reception unit
46 Positioning terminal
48 Observation unit
50 Transmission/reception unit
60 Beacon
100 Electric field map generation/positioning system

The invention claimed is:

1. A computer-implemented method for generating an electronic field map of a space, the method comprising:
   receiving first radio wave strength data observed at each of a first set of points, wherein the first set of points include at least three distinct points with respectively distinct distances in the space from a location of a radio wave transmitter;
   determining, based on the received first radio wave strength data, space propagation characteristics of radio waves from the radio wave transmitter in the space, wherein the space propagation characteristics of radio waves depend on a distance from the radio wave transmitter;
   receiving a point, wherein the point is distinct from points in the first set of points;
   determining a pattern for estimating a radio wave strength data using at least the determined space propagation characteristics, wherein the pattern depends on a distance between the point and the radio wave transmitter;
   determining, based on the determined pattern, a second radio wave strength data at the point; and
   generating, based at least on the determined second radio wave strength data of a combination of the received first radio wave strength data and the determined second radio wave strength data, the electronic field map of the space.

2. The computer-implemented method of claim 1, the method further comprising:
   receiving, based on a plurality of measurement of radio waves from the radio wave transmitter at the first set of points, a plurality of radio wave strength data;
   normalizing the plurality of radio wave strength data; and
   receiving, based on the largest radio wave strength of the normalized plurality of radio strength data, the first radio wave strength data observed at each of the first set of points.

3. The computer-implemented method of claim 1, the method further comprising:
   receiving the radio wave strength data from at least each of the three points in the first set of points of each of a plurality of radio wave transmitters;
   determining each of the space propagation characteristics of radio waves from each of the plurality of radio wave transmitters;
   determining each of radio wave strength data for measuring radio waves from each of the plurality of radio wave transmitters at the second point; and
   generating the electronic field map by associating a combination of:
      each point in the first set of points and the second point,
      the plurality of radio wave transmitters,
      the received radio wave strength data, and
      the determined radio wave strength data.

4. The computer-implemented method of claim 3, the method further comprising:
receiving third radio wave strength data, wherein the third radio wave strength data correspond to radio waves originating from each of the plurality of radio wave transmitters measured at an unknown point; and
determining, based on the received third radio wave strength data and the generated electronic field map, coordinates of the unknown point.

5. The computer-implemented method of claim 1, wherein the radio wave transmitter transmits a beacon signal, the beacon signal including a beacon identifier, the beacon identifier representing the radio wave transmitter.

6. The computer-implemented method of claim 1, wherein the pattern for estimating a radio wave strength data is based on approximating a radio wave propagation curved line using the received first set of radio wave strength data according to an optimization method.

7. A system for generating an electronic field map of a space, the system comprises:
a processor; and
a memory storing computer-executable instructions that when executed by the processor cause the system to:
receive first radio wave strength data observed at each of a first set of points, wherein the first set of points include at least three distinct points with respectively distinct distances in the space from a location of a radio wave transmitter;
determine, based on the received first radio wave strength data, space propagation characteristics of radio waves from the radio wave transmitter in the space, wherein the space propagation characteristics of radio waves depend on a distance from the radio wave transmitter;
receive a point, wherein the point is distinct from points in the first set of points;
determine a pattern for estimating a radio wave strength data using at least the determined space propagation characteristics, wherein the pattern depends on a distance between the point and the radio wave transmitter;
determining, based on the determined pattern, a second radio wave strength data at the point; and
generate, based at least on the determined second radio wave strength data of a combination of the received first radio wave strength data and the determined second radio wave strength data, the electronic field map of the space.

8. The system of claim 7, the computer-executable instructions when executed further causing the system to:
receive, based on a plurality of measurement of radio waves from the radio wave transmitter at the first set of points, a plurality of radio wave strength data;
normalize the plurality of radio wave strength data; and
receive, based on the largest radio wave strength of the normalized plurality of radio strength data, the first radio wave strength data observed at each of the first set of points.

9. The system of claim 7, the computer-executable instructions when executed further causing the system to:
receive the radio wave strength data from at least each of the three points in the first set of points of each of a plurality of radio wave transmitters;
determine each of the space propagation characteristics of radio waves from each of the plurality of radio wave transmitters;
determine each of radio wave strength data for measuring radio waves from each of the plurality of radio wave transmitters at the second point; and
generate the electronic field map by associating a combination of:
each point in the first set of points and the second point,
the plurality of radio wave transmitters,
the received radio wave strength data, and
the determined radio wave strength data.

10. The system of claim 9, the computer-executable instructions when executed further causing the system to:
receive third radio wave strength data, wherein the third radio wave strength data correspond to radio waves originating from each of the plurality of radio wave transmitters measured at an unknown point; and
determine, based on the received third radio wave strength data and the generated electronic field map, coordinates of the unknown point.

11. The system of claim 7, wherein the radio wave transmitter transmits a beacon signal, the beacon signal including a beacon identifier, the beacon identifier representing the radio wave transmitter.

12. The system of claim 7, wherein the pattern for estimating a radio wave strength data is based on approximating a radio wave propagation curved line using the received first set of radio wave strength data according to an optimization method.

13. A computer-readable non-transitory recording medium storing computer-executable instructions that when executed by a processor cause a computer system to:
receive first radio wave strength data observed at each of a first set of points, wherein the first set of points include at least three distinct points with respectively distinct distances in the space from a location of a radio wave transmitter;
determine, based on the received radio wave strength data, space propagation characteristics of radio waves from the radio wave transmitter in the space, wherein the space propagation characteristics of radio waves depend on a distance from the radio wave transmitter;
receive a point, wherein the point is distinct from points in the first set of points;
determine, based on the determined space propagation characteristics of radio wave and a distance between the point and the radio wave transmitter, a second radio wave strength data at the point, wherein the determine the second radio wave strength data further comprises:
determine a pattern for estimating a radio wave strength data using at least the determined space propagation characteristics, wherein the pattern depends on a distance from the radio wave transmitter; and
determine, based on the determined pattern, the second radio wave strength data at the point; and
generate, based at least on the determined second radio wave strength data of a combination of the received first radio wave strength data and the determined second radio wave strength data, the electronic field map of the space.

14. The computer-readable non-transitory recording medium of claim 13, the computer-executable instructions when executed further causing the system to:
receive, based on a plurality of measurement of radio waves from the radio wave transmitter at the first set of points, a plurality of radio wave strength data;
normalize the plurality of radio wave strength data; and receive, based on the largest radio wave strength of the normalized plurality of radio strength data, the first radio wave strength data observed at each of the first set of points.

15. The computer-readable non-transitory recording medium of claim 13, the computer-executable instructions when executed further causing the system to:
   receive the radio wave strength data from at least each of the three points in the first set of points of each of a plurality of radio wave transmitters;
   determine each of the space propagation characteristics of radio waves from each of the plurality of radio wave transmitters;
   determine each of radio wave strength data for measuring radio waves from each of the plurality of radio wave transmitters at the second point; and
   generate the electronic field map by associating a combination of:
      each point in the first set of points and the second point, the plurality of radio wave transmitters, the received radio wave strength data, and the determined radio wave strength data.

16. The computer-readable non-transitory recording medium of claim 15, the computer-executable instructions when executed further causing the system to:
   receive third radio wave strength data, wherein the third radio wave strength data correspond to radio waves originating from each of the plurality of radio wave transmitters measured at an unknown point; and
   determine, based on the received third radio wave strength data and the generated electronic field map, coordinates of the unknown point.

17. The computer-readable non-transitory recording medium of claim 13, wherein the pattern for estimating a radio wave strength data is based on approximating a radio wave propagation curved line using the received first set of radio wave strength data according to an optimization method.

* * * * *